(12) United States Patent
Hirokane et al.

(10) Patent No.: US 8,233,225 B2
(45) Date of Patent: Jul. 31, 2012

(54) OPTICAL LENS

(75) Inventors: Takeshi Hirokane, Kanagawa (JP);
Nobuyuki Kato, Tokyo (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 22 days.

(21) Appl. No.: 13/003,170

(22) PCT Filed: Jul. 6, 2009

(86) PCT No.: PCT/JP2009/062311
§ 371 (c)(1),
(2), (4) Date: Jan. 7, 2011

(87) PCT Pub. No.: WO2010/004965
PCT Pub. Date: Jan. 14, 2010

(65) Prior Publication Data
US 2011/0109980 A1 May 12, 2011

(30) Foreign Application Priority Data

Jul. 7, 2008 (JP) .................................. 2008-176537
Sep. 12, 2008 (JP) .................................. 2008-234734

(51) Int. Cl.
*G02B 9/00* (2006.01)
*B29D 11/00* (2006.01)

(52) U.S. Cl. ......... 359/796; 359/642; 359/900; 264/1.1; 264/1.32

(58) Field of Classification Search ............... 359/642, 359/796, 900; 264/1.1, 1.32
See application file for complete search history.

(56) References Cited

U.S. PATENT DOCUMENTS
2009/0016209 A1   1/2009   Ikeda et al.

FOREIGN PATENT DOCUMENTS

| JP | 01-201324 | 8/1989 |
|----|-----------|--------|
| JP | 07-198901 | 8/1995 |
| JP | 2001-261803 | 9/2001 |
| JP | 2004-300262 | 10/2004 |
| JP | 2006-241446 | 9/2006 |
| JP | 2006-335974 | 12/2006 |
| JP | 2007-178996 | 7/2007 |

*Primary Examiner* — Jack Dinh
(74) *Attorney, Agent, or Firm* — Greenblum & Bernstein, P.L.C.

(57) ABSTRACT

An optical lens is obtained by injection-molding a polyester resin containing a diol unit containing from 40 to 99% by mol of a unit derived from ethylene glycol and from 1 to 60% by mol of a unit derived from a diol having from 3 to 16 carbon atoms, and a dicarboxylic acid unit containing 50% by mol or more of a unit derived from a naphthalenedicarboxylic acid.

11 Claims, No Drawings

OPTICAL LENS

TECHNICAL FIELD

The present invention relates to an optical lens containing a polyester resin having a specific structure.

BACKGROUND ART

Optical glass or an optical transparent resin is used as a material for an optical device used in an optical system of various kinds of cameras, such as a camera, a one-time use camera and a video camera. Optical glass is excellent in heat resistance, transparency, dimensional stability, chemical resistance and the like, and includes various materials having various refractive indices and Abbe numbers, but has problems of high material cost, poor molding workability and low productivity. In particular, formation of an aspherical lens used for aberration correction requires extremely high technique and high cost, which result in a significant barrier on practical use.

On the other hand, an optical lens formed of an optical transparent resin, particularly a thermoplastic transparent resin, has such advantages that the lens can be mass-produced by injection molding and also can be formed easily into an aspherical lens, and thus the lens is currently applied to a lens for a camera. Examples of the resin include polycarbonate containing bisphenol A as a constitutional unit, polymethyl methacrylate and amorphous polyolefin.

In general, aberration of an optical system of a camera is corrected by the combination use of plural of convex lens and a concave lens. Specifically, chromatic aberration formed by a convex lens and a chromatic aberration of a concave lens that is opposite to that of the convex lens are combined to negate the chromatic aberration. In this case, the concave lens is required to have high dispersion (i.e., a low Abbe number).

As for the dispersion (Abbe number) of the aforementioned optical thermoplastic resins, polycarbonate containing bisphenol A as a constitutional unit has a refractive index of approximately 1.59 and an Abbe number of approximately 32, polymethyl methacrylate has a refractive index of approximately 1.49 and an Abbe number of approximately 58, and amorphous polyolefin has a refractive index of approximately 1.54 and an Abbe number of approximately 56. Only polycarbonate may be used as a concave lens for aberration correction, but its Abbe number of 32 cannot be considered as sufficiently high dispersion.

Patent Document 1 discloses polycarbonate containing 3,9-bis(1,1-dimethyl-2-hydroxyethyl)-2,4,8,10-tetraoxaspiro[5.5]undecane as a constitutional unit, but the Abbe number thereof is larger than that of polycarbonate containing bisphenol A as a constitutional unit.

Patent Document 2 discloses a polyester resin composition formed by copolymerization of a fluorene dihydroxy compound having a refractive index of 1.66 and an Abbe number of approximately 20 as a resin for use as a concave lens for aberration correction. The resin has a sufficiently large dispersion (i.e., a low Abbe number) but has the following defects as a resin for an optical lens. That is, the resin is formed by copolymerization of a large amount of a fluorene dihydroxy compound, which is bulky and rigid, and thus the resin has a considerably high melt viscosity and is poor in moldability. As a measure for improving the moldability, the melt viscosity upon molding may be lowered, i.e., the molding temperature may be increased, but such problems may occur thereby that coloration upon molding is intensified, and the mold is contaminated with thermal decomposition products. Such a measure is also considered that the melt viscosity is lowered by decreasing the polymerization degree, but the case involves such problems that the content of low molecular weight components in the resin is relatively increased to contaminate the mold with the low molecular weight components or decomposition products of the low molecular weight components. Accordingly, there has been no proposal of an optical lens formed of a thermoplastic resin that has both excellent optical characteristics (i.e., a high refractive index and a low Abbe number) and practically sufficient moldability.

Patent Document 3, which belongs a technical field that is different from the present invention, discloses a lens sheet for a liquid crystal display device, containing an optical device formed on a surface of a transparent substrate containing a polyester resin that is constituted by a diol unit, in which from 1 to 80% by mol of the diol unit has a cyclic acetal skeleton, and a dicarboxylic acid unit.

PRIOR ART DOCUMENT

Patent Document

[Patent Document 1] JP-A-2003-160659
[Patent Document 2] JP-A-2006-335974
[Patent Document 3] JP-A-2007-178996

SUMMARY OF THE INVENTION

Problems to be Solved by the Invention

In view of the aforementioned problems, an object of the present invention is to provide an optical lens obtained by molding a polyester resin that has a high refractive index and a low Abbe number and is good in moldability.

Means for Solving the Problems

The present invention relates to an optical lens obtained by molding a polyester resin containing a diol unit containing from 40 to 99% by mol of a unit derived from ethylene glycol and from 1 to 60% by mol of a unit derived from a diol having from 3 to 16 carbon atoms, and a dicarboxylic acid unit containing 50% by mol or more of a unit derived from a naphthalenedicarboxylic acid, and having the following property (1):

(1) an Abbe number of a test piece formed by annealing an injection molded piece having a thickness of 3 mm at a temperature of (Tg−20)° C. for 10 hours is 25 or less.

Advantages of the Invention

The optical lens of the present invention uses a polyester resin that has a high refractive index and a low Abbe number and is good in moldability, and therefore the optical lens can be formed by injection molding and thus is of high productivity and low cost. Accordingly, the optical lens is considerably useful in the fields where an expensive high refractive index glass lens is used, such as a camera, a telescope, binoculars and a television projector. According to the present invention, furthermore, it is considerably useful since an aspherical lens with a high refractive index and a low birefringence, a glass lens of which has been difficult to be processed technically, can be conveniently produced by injection molding. The optical lens of the present invention is useful particularly as a concave lens for color aberration correction.

EMBODIMENT FOR CARRYING OUT THE INVENTION

The polyester resin used in the present invention contains a diol unit containing from 40 to 99% by mol of a unit derived from ethylene glycol and from 1 to 60% by mol of a unit derived from a diol having from 3 to 16 carbon atoms. The use of the unit derived from ethylene glycol in the aforementioned range retains the heat resistance and the mechanical capability of the polyester resin used in the present invention at a satisfactory level. The use of the unit derived from a diol having from 3 to 16 carbon atoms in the aforementioned range lowers the crystallinity of the polyester resin used in the present invention, whereby the polyester resin can be favorably used as an optical lens.

In the present invention, the polyester resin contains a dicarboxylic acid unit containing 50% by mol or more of a unit derived from a naphthalenedicarboxylic acid. The use of the unit derived from a naphthalenedicarboxylic acid in the aforementioned range makes the polyester resin of the present invention to have sufficient heat resistance and a high refractive index, whereby the polyester resin can be favorably used as an optical lens. Accordingly, from the standpoint of heat resistance, mechanical capability and low crystallinity of the polyester resin, the ratio of the unit derived from ethylene glycol in the diol unit is preferably from 70 to 99% by mol, more preferably from 80 to 99% by mol, further preferably from 85 to 99% by mol, and particularly preferably from 90 to 99% by mol, and the ratio of the unit derived from a diol having from 3 to 16 carbon atoms in the diol unit is preferably from 1 to 30% by mol, more preferably 1 to 20% by mol, further preferably from 1 to 15% by mol, and particularly preferably from 1 to 10% by mol. The ratio of the unit derived from a naphthalenedicarboxylic acid in the dicarboxylic acid unit is preferably 70% by mol or more, more preferably 85% by mol or more, further preferably 95% by mol or more, and particularly preferably 100%.

In consideration of the use of the polyester resin of the invention as an optical lens, particularly as a concave lens for aberration correction, the polyester resin may have a refractive index of 1.59 or more, preferably 1.61 or more, and more preferably 1.63 or more. The upper limit thereof is not particularly limited and is preferably 1.65 or less from the standpoint of balance with the other properties. The polyester resin may have an Abbe number of 30 or less, preferably 25 or less, more preferably 21 or less, particularly preferably 20 or less. The lower limit of the Abbe number is not particularly limited and is 19 or more from the standpoint of balance with the other properties. The refractive index and the Abbe number of the polyester resin can be easily controlled to desired values by configuring the constitutional units and the ratios thereof of the polyester resin according to the aforementioned manner. The refractive index and the Abbe number are measured in the following manners.

An injection molded piece having a thickness of 3 mm of the polyester resin is annealed in an oven at a temperature of (Tg−20)° C. for 10 hours to prepare a specimen to be measured. The refractive index is a value measured at 589 nm (d line), and the Abbe number is a value calculated from refractive indices measured at 656 nm (C line), 486 nm (F line) and d line.

The diol constitutional unit having from 3 to 16 carbon atoms of the polyester resin used in the present invention is not particularly limited, and examples thereof include an aliphatic diol, such as trimethylene glycol, 2-methyl-1,3-propanediol, 1,4-butanediol, 1,5-pentanediol, 1,6-hexanediol, diethylene glycol, propylene glycol and neopentyl glycol; an alicyclic diol, such as 2,2,4,4-tetramethyl-1,3-cyclobutanediol, 1,3-cyclohexanedimethanol, 1,4-cyclohexanedimethanol, 1,2-decahydronaphthalenedimethanol, 1,3-decahydronaphthalenedimethanol, 1,4-decahydronaphthalenedimethanol, 1,5-decahydronaphthalenedimethanol, 1,6-decahydronaphthalenedimethanol, 2,7-decahydronaphthalenedimethanol, tetralindimethanol, norbornanedimethanol, tricyclodecanedimethanol and pentacyclododecanedimethanol; a diol having a cyclic acetal skeleton; and a bisphenol compound, such as 4,4'-isopropylidenediphenol (bisphenol A) and methylenediphenol (bisphenol F). The unit derived from the diol having from 3 to 16 carbon atoms in the polyester resin may be constituted by a single kind or may be constituted by plural kinds. Among these 2-methyl-1,3-propanediol, neopentyl glycol, 1,4-cyclohexanedimethanol and a diol having a cyclic acetal skeleton are preferred in consideration of mechanical capability, heat resistance and economy of the polyester resin, and a diol having a cyclic acetal skeleton is particularly preferred in consideration of heat resistance and effect of decreasing the crystallinity of the polyester resin.

The diol unit having a cyclic acetal skeleton as the diol having from 3 to 16 carbon atoms will be described in detail. Preferred examples of the diol unit having a cyclic acetal skeleton include a unit derived from a compound represented by the following general formula (1) or (2):

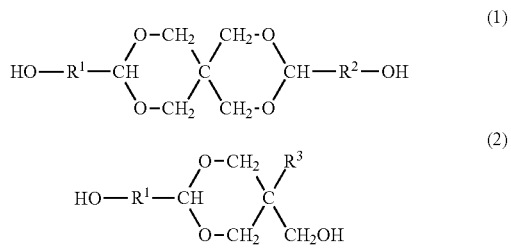

In the general formulae (1) and (2), $R^1$ and $R^2$ each independently represent a hydrocarbon group selected from the group of an aliphatic hydrocarbon group having from 1 to 8 carbon atoms, an alicyclic hydrocarbon group having from 3 to 8 carbon atoms and an aromatic hydrocarbon group having from 6 to 8 carbon atoms. Preferred examples of $R^1$ and $R^2$ include a methylene group, an ethylene group, a propylene group, a butylene group and structural isomers thereof. Examples of the structural isomer include an isopropylene group and an isobutylene group. $R^3$ represents a hydrocarbon group selected from the group of an aliphatic hydrocarbon group having from 1 to 8 carbon atoms, an alicyclic hydrocarbon group having from 3 to 8 carbon atoms and an aromatic hydrocarbon group having from 6 to 8 carbon atoms. Preferred examples of $R^3$ include a methyl group, an ethyl group, a propyl group, a butyl group and structural isomers thereof. Examples of the structural isomer include an isopropyl group and an isobutyl group. Preferred examples of the compound represented by the general formula (1) or (2) include 3,9-bis(1,1-dimethyl-2-hydroxyethyl)-2,4,8,10-tetraoxaspiro[5.5]undecane and 5-methylol-5-ethyl-2-(1,1-dimethyl-2-hydroxyethyl)-1,3-dioxane, and particularly preferred examples thereof include 3,9-bis(1,1-dimethyl-2-hydroxyethyl)-2,4,8,10-tetraoxaspiro[5.5]undecane.

Examples of the dicarboxylic acid unit having a naphthalene skeleton of the polyester resin used in the present invention include units derived from 1,3-naphthalenedicarboxylic acid, 1,4-naphthalenedicarboxylic acid, 1,5-naphthalenedicarboxylic acid, 2,6-naphthalenedicarboxylic acid and 2,7-naphthalenedicarboxylic acid. The dicarboxylic acid unit having a naphthalene skeleton in the polyester resin may be constituted by a single kind or may be constituted by plural kinds. Among these, a unit derived from 2,6-naphthalenedicarboxylic acid is particularly preferred from the standpoint of refractive index, Abbe number, heat resistance, mechanical capability and economy.

The polyester resin used in the present invention may contain a dicarboxylic acid unit having no naphthalene skeleton in a range that does not exceed 50% by mol. The dicarboxylic acid unit having no naphthalene skeleton is not particularly limited, and examples thereof include units derived from an aliphatic dicarboxylic acid, such as succinic acid, glutaric acid, adipic acid, pimelic acid, suberic acid, azelaic acid, sebacic acid, decanedicarboxylic acid, dodecanedicarboxylic acid, cyclohexanedicarboxylic acid, decalindicarboxylic acid, norbornanedicarboxylic acid, tricyclodecanedicarboxylic acid, pentacyclododecanedicarboxylic acid, 3,9-bis(1,1-dimethyl-2-carboxyethyl)-2,4,8,10-tetraoxaspiro[5.5]undecane, 5-carboxy-5-ethyl-2-(1,1-dimethyl-2-carboxyethyl)-1,3-dioxane and dimer acid; and units derived from an aromatic dicarboxylic acid, such as terephthalic acid, isophthalic acid, phthalic acid, 2-methylterephthalic acid, biphenyldicarboxylic acid and tetralindicarboxylic acid. The dicarboxylic acid unit may be constituted by a single kind or may be constituted by plural kinds.

The polyester resin may contain a monoalcohol unit, such as butyl alcohol, hexyl alcohol and octyl alcohol, a trihydric or higher polyhydric alcohol unit, such as trimethylolpropane, glycerin, 1,3,5-pentanetriol and pentaerythritol, a monocarboxylic acid unit, such as benzoic acid, propionic acid and butyric acid, a polybasic carboxylic acid unit, such as trimellitic acid and pyromellitic acid, an oxyacid unit, such as glycolic acid, lactic acid, hydroxybutyric acid, 2-hydroxyisobutyric acid and hydroxybenzoic acid, for controlling the melt viscoelasticity and the molecular weight of the polyester resin, in such a range that does not impair the advantages of the present invention.

In the polyester resin used in the present invention, in consideration of high refractive index, low Abbe number, high heat resistance, excellent mechanical capability and low crystallinity, it is preferred that the dicarboxylic acid constitutional unit is wholly a unit derived from a naphthalenedicarboxylic acid, and the diol unit contains from 70 to 99% by mol of a unit derived from ethylene glycol and from 1 to 30% by mol of a unit derived from a diol having from 3 to 16 carbon atoms. The ratios of the unit derived from ethylene glycol and the unit derived from a diol having from 3 to 16 carbon atoms are more preferably those described as preferred ranges above. In the present invention, it is particularly preferred that the diol unit contains from 90 to 99% by mol of a unit derived from ethylene glycol and from 1 to 10% by mol of a unit derived from 3,9-bis(1,1-dimethyl-2-hydroxyethyl)-2,4,8,10-tetraoxaspiro[5.5]undecane as a constitutional unit, and the dicarboxylic acid unit is wholly a unit derived from 2,6-naphthalenedicarboxylic acid.

The polyester resin used in the present invention may have a glass transition temperature measured with a differential scanning calorimeter of 110° C. or more, preferably 115° C. or more, further preferably 120° C. or more and still further preferably 125° C. or more. In the case where the glass transition temperature of the polyester resin is in the range, the optical lens of the present invention can sufficiently withstand a surface treatment, such as hardcoat. The glass transition temperature of the polyester resin can be easily controlled to 110° C. or more by appropriately selecting the diol having a cyclic acetal skeleton and the dicarboxylic acid having a naphthalene skeleton, as described above.

The intrinsic viscosity (IV) of the polyester resin used in the present invention is not particularly limited and is preferably from 0.3 to 1.2 dL/g, more preferably from 0.4 to 1.0 dL/g, and further preferably from 0.5 to 0.8 dL/g, in terms of a measured value in a mixed solvent of phenol and 1,1,2,2-tetrachloroethane at a mass ratio of 6/4 at 25° C., in consideration of selecting an injection molding as a molding method of the optical lens or sufficient exhibition of the mechanical capability of the optical lens. In the case where the intrinsic viscosity is in the range, the polyester resin used in the present invention is excellent in balance between moldability and mechanical capability.

The intrinsic viscosity (IV) of the polyester resin used in the present invention is also preferably from 0.25 to 1.0 dL/g, more preferably from 0.30 to 0.70 dL/g, further preferably from 0.30 to 0.60 dL/g, and still further preferably from 0.40 to 0.60 dL/g, in consideration of prevention of exhibition of birefringence upon molding.

In the case where the intrinsic viscosity is in the range, the polyester resin used in the present invention is excellent in balance among moldability, mechanical capability and low birefringence. In the case where the intrinsic viscosity exceeds the range, exhibition of birefringence may not be prevented upon molding, which may result in an optical lens having large birefringence. In the case where the intrinsic viscosity is lower than the lower limit, the mechanical capability of the optical lens may not be sufficiently exhibited.

The melt viscosity of the polyester resin used in the present invention is not particularly limited and is preferably from 40 to 3,000 Pa·s, more preferably from 100 to 3,000 Pa·s, and further preferably from 300 to 1,000 Pa·s, under conditions of a temperature of 280° C. and a shearing velocity of 100 $sec^{-1}$, in consideration of injection molding employed as a molding method for the optical lens and sufficient exhibition of the mechanical capability of the optical lens. In the case where the melt viscosity is in the range, the polyester resin used in the present invention is excellent in balance between moldability and mechanical capability.

The melt viscosity of the polyester resin used in the present invention is also preferably from 10 to 500 Pa·s, more preferably from 20 to 250 Pa·s, and further preferably from 30 to 150 Pa·s, in consideration of prevention of exhibition of birefringence upon molding.

The melt index of the polyester resin used in the present invention is not particularly limited and may be from 1 to 300 g per 10 minutes, preferably from 5 to 200 g per 10 minutes, more preferably from 5 to 150 g per 10 minutes, further preferably from 10 to 150 g per 10 minutes, and particularly preferably from 20 to 100 g per 10 minutes, under conditions of a temperature of 260° C. and a load of 2.16 kgf, in consideration of injection molding employed as a molding method for the optical lens, sufficient exhibition of the mechanical capability of the optical lens and prevention of exhibition of birefringence upon molding. In the case where the melt index is in the range, the polyester resin used in the present invention is excellent in balance among moldability, mechanical capability and low birefringence. In the case where the melt index is lower than the lower limit, exhibition of birefringence may not be prevented upon molding, which may result in an optical lens having large birefringence. In the case where the melt index exceeds the range, the mechanical capability of the optical lens may not be sufficiently exhibited.

The polyester resin used in the optical lens of the present invention is small in birefringence, particularly in birefringence due to orientation. The optical lens of the present invention molded by injection molding thus has small birefringence accordingly. The orientation birefringence of the polyester resin of the present invention is evaluated in the following manner. A sheet obtained by extrusion molding is uniaxially stretched at a temperature of (glass transition temperature+20)° C. to prepare stretched films various stretching ratios. The films are measured for birefringence ($\Delta n$). A linear relationship is obtained by plotting the stretching ratio as the X-axis and the birefringence as the Y-axis. The gradient of the linear relationship is designated as the orientation birefringence. The orientation birefringence of the polyester resin used in the present invention is preferably from $-60\times10^{-3}$ to $+60\times10^{-3}$, more preferably from $-10\times10^{-3}$ to $+10\times10^{-3}$, further preferably from $-6\times10^{-3}$ to $+6\times10^{-3}$, still further preferably from $-5\times10^{-3}$ to $+5\times10^{-3}$, and particularly preferably from $-3\times10^{-3}$ to $+3\times10^{-3}$. The orientation birefringence is preferably in the range since exhibition of birefringence due to flow orientation upon molding the optical lens can be prevented.

A method for producing the polyester resin used in the present invention is not particularly limited, and a known production method for polyester may be applied. Examples of the method include a melt polymerization method, such as transesterification method and a direct esterification method, and a solution polymerization method, and a transesterification method is particularly preferred. Catalysts, such as a transesterification catalyst, an esterification catalyst and a polycondensation catalyst, stabilizers, such as an etherification preventing agent, a thermal stabilizer and a light stabilizer, a polymerization controlling agent and the like may be known products. These may be appropriately selected depending on the reaction rate and the color, safety, thermal stability, weather resistance, elution property and the like of the polyester resin. Examples of the catalysts include a compound of a metal, such as zinc, lead, cerium, cadmium, manganese, cobalt, lithium, sodium, potassium, calcium, nickel, magnesium, vanadium, aluminum, titanium, antimony and tin (for example, a fatty acid salt, a carbonate salt, a phosphate salt, a hydroxide, a chloride, an oxide and an alkoxide), and metallic magnesium, which may be used solely or as a combination of plural kinds thereof. The amount of the transesterification catalyst used in the transesterification method is preferably from 0.001 to 1% by mol, and more preferably from 0.005 to 0.5% by mol, based on the dicarboxylic acid unit, and a compound of manganese among the aforementioned catalysts is particularly preferred as the transesterification catalyst. The amount of the polycondensation catalyst used is preferably from 0.001 to 1% by mol, and more preferably from 0.005 to 0.5% by mol, based on the dicarboxylic acid unit, and a compound of antimony among the aforementioned catalysts is particularly preferred as the polycondensation catalyst.

The polyester resin used in the present invention may contain an additional resin, various additives, such as an antioxidant, a light stabilizer, an ultraviolet ray absorbent, a plasticizer, an extender, a matting agent, a drying controlling agent, an antistatic agent, a sedimentation preventing agent, a surfactant, a flow improver, a drying oil, wax, a filler, a colorant, a reinforcing agent, a surface smoothing agent, a leveling agent, a curing reaction accelerator and a thickening agent, and a molding assistant. As a flow improver, an ester of a polyhydric alcohol and a fatty acid, particularly stearate ester of glycerin, may be added in an amount of 5,000 ppm or less, preferably 3,000 ppm or less, more preferably 1,000 ppm or less, and particularly preferably 500 ppm or less, thereby favorably preventing problems caused by failure on releasing the resin from a mold.

In the polyester resin used in the present invention, the content of foreign matters (such as dusts and burnt deposits of the resin) is preferably as small as possible, and such an operation is preferably performed as filtration of the molten raw materials, filtration of the catalyst liquid and filtration of the molten oligomer. The filter used preferably has a mesh of 5 μm or less, and more preferably 1 μm or less. The resin thus formed is preferably filtered with a polymer filter. The polymer filter used preferably has a mesh of 100 μm or less, and more preferably 30 μm or less. The operation of collecting the resin pellets may be performed in a low-dust environment, which is preferably a class 1000 clean room, and more preferably a class 100 clean room.

The optical lens of the present invention may be provided by injection-molding the polyester resin into a lens shape with an injection molding machine or an injection compression molding machine. In order to prevent maximally foreign matter from being mixed therein, the environment where the resin is molded may be performed in a low-dust environment, which is preferably a class 1000 clean room, and more preferably a class 100 clean room. The conditions of injection molding in the present invention are not particularly limited, and from the standpoint of prevention of deterioration and crystallization of the resin, it is preferred that the mold temperature is from 10 to 100° C. and the cylinder temperature is from 230 to 290° C., and it is more preferred that the mold temperature is from 20 to 95° C. and the cylinder temperature is from 240 to 280° C. The polyester resin is preferably dried under the condition of from 100 to 110° C. for from 8 to 16 hours by vacuum drying or the like, before injection molding.

The optical lens of the present invention is preferably practiced as an aspherical lens depending on necessity. An aspherical lens can substantially negate spherical aberration with a single lens, thereby preventing plural spherical lenses from being used for negating spherical aberration, and therefore, reduction in weight and production cost can be achieved. Accordingly, an aspherical lens is particularly useful as a lens for a camera among optical lenses. The aspherical lens preferably has an astigmatism of from 0 to 15 mλ, and more preferably from 0 to 10 mλ.

The optical lens of the present invention may have on the surface thereof a coated layer, such as an antireflection layer and a hardcoat layer, depending on necessity. The antireflection layer may have a single layer structure or a multilayer structure and may be formed of an organic material or an inorganic material, and preferably an inorganic material. Specific examples of the inorganic material include an oxide and a fluoride, such as silicon oxide, aluminum oxide, zirconium oxide, titanium oxide, cerium oxide, magnesium oxide and magnesium fluoride.

The optical lens of the present invention may be applied to various lenses including a pick-up lens, an f-θ lens and a spectacle lens, and may be applied particularly preferably to a lens for correcting chromatic aberration in consideration of high refractive index and low Abbe number. Specifically, the optical lens can be favorably applied to lenses of a single-lens reflex camera, a digital still camera, a video camera, a cell phone camera, a one-time use camera, a telescope, binoculars and a projector. In the case where the optical lens of the present invention is a concave lens, an optical lens having less chromatic aberration can be formed by combining with another convex lens having a high Abbe number. The Abbe number of the convex lens to be combined with the optical lens of the present invention is preferably from 40 to 60, and more preferably from 50 to 60.

EXAMPLE

The invention will be described in more detail with reference to examples below, but the invention is not limited in scope thereof by the examples.

The evaluation methods of the polyester resins and the optical lenses used in the examples are as follows.

Evaluation Methods of Polyester Resin (1) Resin Composition

The ratios of the ethylene glycol unit, the other diol unit and the naphthalenedicarboxylic acid unit in the polyester resin were calculated from $^1$H-NMR measurement. The measurement apparatus used was Model JNM-AL400, produced by JEOL, Ltd., and the measurement is performed at 400 MHz. The solvent mainly used was deuterated chloroform.

(2) Glass Transition Temperature (Tg)

The glass transition temperature of the polyester resin was measured with DSC, Ta-50WS, produced by Shimadzu Corporation, in the following manner. Approximately 10 mg of the polyester resin placed in an aluminum unsealed vessel was heated to 280° C. at a temperature increasing rate of 20° C. per minute under a nitrogen stream (30 mL/min), and the molten resin was quenched to prepare a specimen to be measured. The specimen was measured under the same conditions, and the temperature where the DSC curve was transferred by ½ of the difference between the base lines before and after the transition was designated as the glass transition temperature.

(3) Intrinsic Viscosity (IV)

The intrinsic viscosity was obtained in the following manner. 0.5 g of the polyester resin was dissolved in 120 g of a mixed solvent of phenol and 1,1,2,2-tetrachloroethane at a mass ratio of 6/4 under heating, and the solution is filtered and cooled to 25° C. to prepare an undiluted solution for measurement. Three kinds of solutions for measurement, i.e., the undiluted solution for measurement and diluted solutions obtained by diluting the undiluted solution for measurement by ⅕ and ½ with the mixed solvent, are measured for specific viscosity, and the intrinsic viscosity was calculated by extrapolating the specific viscosity values of the solutions to infinite dilution. The apparatus used for measurement was an automatic capillary viscosity measuring apparatus, SS-300L1, produced by Shibayama Scientific Co., Ltd., and the measurement was performed at 25° C.

(4) Refractive Index and Abbe Number

The resulting polyester resin was dried under vacuum under a condition of (glass transition temperature−20)° C. for 10 hours and injection molded with SHSO, produced by Sumitomo Heavy Industries, Ltd., at a cylinder temperature of 280° C. and a mold temperature of (Tg−35)° C. into an isosceles triangular shape with an edge of 20 mm (thickness: 3 mm). The resulting molded piece was annealed in an oven at (Tg−20)° C. for 10 hours to prepare a specimen for measurement. The specimen was measured for refractive index and Abbe number with a refractive index measuring apparatus, produced by Atago Co., Ltd. The refractive index was measured at 589 nm (d line), and the Abbe number was calculated from refractive indices measured at 656 nm (C line), 486 nm (F line) and d line.

(5) Melt Viscosity

The measurement apparatus used was Capillograph, produced by Toyo Seiki Seisaku-sho, Ltd. The measurement temperature was 280° C., and the shearing velocity was 100 (1/sec).

(6) Melt Index (MI)

The measurement apparatus used was Melt Indexer, produced by Toyo Seiki Seisaku-sho, Ltd. The measurement temperature was 260° C., and the load was 2.16 kgf.

(7) Orientation Birefringence

The resulting polyester resin was extrusion molded into a sheet having a thickness of 200 μm. The molding temperature was 250° C. The sheet was uniaxially stretched at a temperature of (glass transition temperature+20)° C. The stretching ratio was 1.1, 1.2, 1.3 and 1.4. The stretching apparatus used was an apparatus produced by Toyo Seiki Seisaku-sho, Ltd. The resulting stretched films were measured for birefringence with an ellipsometer, produced by JASCO Corporation. The stretching ratio was plotted as the X-axis, the birefringence was plotted as the Y-axis, and the gradient was designated as the orientation birefringence.

Evaluation Method of Optical Lens (8) Appearance Evaluation

The appearance of the optical lens was evaluated for transparency and transcription by the following standard in visual.

good: transparent and good surface condition whitened: whitening observed

Examples 1 to 5 and Comparative Examples 1 and 2

Production and Evaluation of Polyester Resins

Raw material monomers shown in Tables 1 and 2 were charged in a polyester producing apparatus of 0.15 m$^3$ equipped with a packed column type rectification column, a partial condenser, a total condenser, a cold trap, an agitator, a heating device and a nitrogen introducing tube, and transesterification reaction was performed in the presence of manganese acetate tetrahydrate in an amount of 0.03% by mol based on the dicarboxylic acid component by increasing the temperature to 215° C. under a nitrogen atmosphere. After attaining 90% or more of the reaction conversion of the dicarboxylic acid component, antimony (III) oxide in an amount of 0.02% by mol and triethyl phosphate in an amount of 0.06% by mol, both based on the dicarboxylic acid component, were added thereto, and polycondensation was performed by gradually increasing the temperature and gradually decreasing the pressure to finally 280° C. and 0.1 kPa or less. The reaction was terminated when a suitable melt viscosity was obtained, thereby producing a polyester resin.

The evaluation results are shown in Tables 1 and 2.

In abbreviations in the tables have the following meanings.

NDCM: dimethyl 2,6-naphthalenedicarboxylate

DMT: dimethyl terephthalate

EG: ethylene glycol

SPG: 3,9-bis(1,1-dimethyl-2-hydroxyethyl)-2,4,8,10-tetraoxaspiro[5.5]undecane

Production and Evaluation of Optical Lenses

The resulting polyester resin was dried under vacuum conditions of (glass transition temperature−20)° C. for 10 hours, and then injection molded with SHSO, produced by Sumitomo Heavy Industries, Ltd., at a cylinder temperature of 280° C. and a mold temperature of (Tg−35)° C., thereby providing a biconvex lens having a diameter of 28 mm, a curvature radius of 20 mm for both convex surfaces. Evaluation results of the lenses thus obtained are shown in Tables 1 and 2.

TABLE 1

|  |  | Example 1 | Example 2 | Example 3 | Example 4 |
|---|---|---|---|---|---|
| Monomer Charged Amount (mol) | | | | | |
| Dicarboxylic acid component | NDCM | 193.6 | 173.7 | 205.3 | 193.6 |
| | DMT | — | — | — | — |
| Diol component | SPG | 19.4 | 34.7 | 10.3 | 19.4 |
| | EG | 329.0 | 278.0 | 318.2 | 329.0 |
| Evaluation Results of Polyester Resin | | | | | |
| Copolymerization composition (% by mol) | NDCM | 100 | 100 | 100 | 100 |
| | SPG | 10 | 20 | 5 | 10 |
| | EG* | 90 | 80 | 95 | 90 |
| Tg (° C.) | | 127 | 130 | 125 | 127 |
| IV (dL/g) | | 0.55 | 0.56 | 0.51 | 0.36 |
| Refractive index | | 1.630 | 1.619 | 1.638 | 1.630 |
| Abbe number | | 19 | 20 | 19 | 19 |
| Melt viscosity (Pa·s) | | 500 | 500 | 300 | 60 |
| MI (g per 10 minutes) | | 5.5 | 5.2 | 7.2 | 55.0 |
| Orientation birefringence (×10$^{-3}$) | | 45 | 42 | 54 | 7.4 |
| Evaluation of Optical Lens | | | | | |
| Appearance | | good | good | good | good |

*Value including constitutional unites derived from EG, such as diethylene glycol and triethylene glycol.

TABLE 2

|  |  | Example 5 | Comparative Example 1 | Comparative Example 2 |
|---|---|---|---|---|
| Monomer Charged Amount (mol) | | | | |
| Dicarboxylic acid component | NDCM | 193.6 | 218.5 | — |
| | DMT | — | — | 369.5 |
| Diol component | SPG | 19.4 | — | — |
| | EG | 329.0 | 393.3 | 591.2 |
| Evaluation Results of Polyester Resin | | | | |
| Copolymerization composition (% by mol) | NDCM | 100 | 100 | 0 |
| | SPG | 10 | 0 | 0 |
| | EG* | 90 | 100 | 100 |
| Tg (° C.) | | 127 | 124 | 84 |
| IV (dL/g) | | 0.29 | 0.55 | 0.72 |
| Refractive index | | 1.630 | 1.649 | 1.575 |
| Abbe number | | 19 | 65 | 39 |
| Melt viscosity (Pa·s) | | 40 | 600 | 500 |
| MI (g per 10 minutes) | | 110.0 | 4.8 | 5.3 |
| Orientation birefringence (×10$^{-3}$) | | 2.3 | 54 | — |
| Evaluation of Optical Lens | | | | |
| Appearance | | good | whitened | whitened |

*Value including constitutional unites derived from EG, such as diethylene glycol and triethylene glycol.

INDUSTRIAL APPLICABILITY

The optical lens of the present invention has a high refractive index, a low Abbe number and good moldability, and thus can be injection molded with high productivity and low cost. Accordingly, the optical lens is considerably useful in the fields where an expensive high refractive index glass lens is used, such as a camera, a telescope, binoculars and a television projector. Furthermore, an aspherical lens with a high refractive index and a low birefringence, a glass lens of which has been difficult to be processed technically, can be conveniently produced by injection molding, and thus the optical lens is useful particularly as a concave lens for color aberration correction.

The invention claimed is:

1. An optical lens obtained by injection molding a polyester resin containing a diol unit containing from 40 to 99% by mol of a unit derived from ethylene glycol and from 1 to 60% by mol of a unit derived from a diol having from 3 to 16 carbon atoms, and a dicarboxylic acid unit containing 50% by mol or more of a unit derived from a naphthalenedicarboxylic acid, and having the following property (1):

(1) an Abbe number of a test piece formed by annealing an injection molded piece having a thickness of 3 mm at a temperature of (Tg−20)° C. for 10 hours is 25 or less.

2. The optical lens according to claim 1, wherein the diol having from 3 to 16 carbon atoms is a diol having a cyclic acetal skeleton.

3. The optical lens according to claim 2, wherein the diol having a cyclic acetal skeleton is a diol represented by the following general formula (1) or (2):

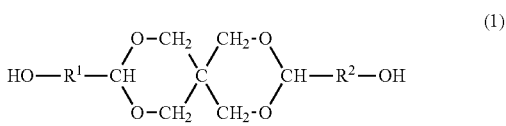

wherein $R^1$ and $R^2$ each independently represent a hydrocarbon group selected from an aliphatic hydrocarbon group having from 1 to 8 carbon atoms, an alicyclic hydrocarbon group having from 3 to 8 carbon atoms and an aromatic hydrocarbon group having from 6 to 8 carbon atoms,

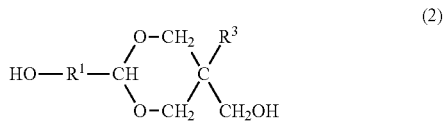

wherein $R^1$ has the same meaning as above; and $R^3$ represents a hydrocarbon group selected from an aliphatic hydrocarbon group having from 1 to 8 carbon atoms, an alicyclic hydrocarbon group having from 3 to 8 carbon atoms and an aromatic hydrocarbon group having from 6 to 8 carbon atoms.

4. The optical lens according to claim 2, wherein the diol having a cyclic acetal skeleton is 3,9-bis(1,1-dimethyl-2-hydroxyethyl)-2,4,8,10-tetraoxaspiro[5.5]undecane or 5-methylol-5-ethyl-2-(1,1-dimethyl-2-hydroxyethyl)-1,3-dioxane.

5. The optical lens according to claim 1, wherein the naphthalenedicarboxylic acid is 2,6-naphthalenedicarboxylic acid.

6. The optical lens according to claim 1, wherein the dicarboxylic acid unit is wholly a unit derived from 2,6-naphthalenedicarboxylic acid, and the diol unit contains from 70 to 99% by mol of a unit derived from ethylene glycol and from 1 to 30% by mol of a unit derived from a diol having from 3 to 16 carbon atoms.

7. The optical lens according to claim 1, wherein the optical lens has an intrinsic viscosity (IV) of from 0.30 to 0.60 dL/g.

8. The optical lens according to claim 1, wherein the optical lens has a melt index of from 10 to 150 g per 10 minutes under conditions of a temperature of 260° C. and a load of 2.16 kgf.

9. The optical lens according to claim 1, wherein the optical lens is a lens for a camera.

10. An optical lens system comprising a combination of the optical lens according to claim 1, and another optical lens.

11. A method for producing an optical lens comprising: by injection-molding a polyester resin containing a diol unit containing from 40 to 99% by mol of a unit derived from ethylene glycol and from 1 to 60% by mol of a unit derived from a diol having from 3 to 16 carbon atoms, and a dicarboxylic acid unit containing 50% by mol or more of a unit derived from a naphthalenedicarboxylic acid, and having the following property (1):

(1) an Abbe number of a test piece formed by annealing an injection molded piece having a thickness of 3 mm at a temperature of (Tg−20)° C. for 10 hours is 25 or less.

* * * * *